(12) United States Patent
Lien

(10) Patent No.: US 11,616,443 B2
(45) Date of Patent: Mar. 28, 2023

(54) BUCK-BOOST CONVERTER

(71) Applicant: PEGATRON CORPORATION, Taipei (TW)

(72) Inventor: En-Kai Lien, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 73 days.

(21) Appl. No.: 17/473,812

(22) Filed: Sep. 13, 2021

(65) Prior Publication Data

US 2022/0140733 A1 May 5, 2022

(30) Foreign Application Priority Data

Oct. 29, 2020 (TW) ................................ 109137676

(51) Int. Cl.
*H02M 3/158* (2006.01)
*H02M 1/08* (2006.01)

(52) U.S. Cl.
CPC ........... *H02M 3/1582* (2013.01); *H02M 1/08* (2013.01); *H02M 3/1588* (2013.01)

(58) Field of Classification Search
CPC ............. H02M 3/1582; H02M 3/1588; H02M 1/0054; H02M 1/38; H02M 1/088; Y02B 70/10
See application file for complete search history.

(56) References Cited

U.S. PATENT DOCUMENTS

| 10,784,775 B1 | 9/2020 | Chang et al. |
| 2005/0213354 A1 | 9/2005 | Pai |
| 2014/0103962 A1* | 4/2014 | Ajram .................. H03K 17/082 327/108 |
| 2015/0381039 A1* | 12/2015 | Hari ..................... H02M 3/1582 323/271 |
| 2021/0063468 A1* | 3/2021 | Gunasekaran ....... H03K 17/687 |
| 2022/0069710 A1* | 3/2022 | Vispute ............... H02M 3/1582 |
| 2022/0239224 A1* | 7/2022 | Liao ..................... H02M 3/158 |

FOREIGN PATENT DOCUMENTS

TW 201347377 11/2013

OTHER PUBLICATIONS

"Search Report of Europe Counterpart Application", dated Mar. 3, 2022, p. 1-p. 11.

* cited by examiner

*Primary Examiner* — Kyle J Moody
*Assistant Examiner* — Jye-June Lee
(74) *Attorney, Agent, or Firm* — J.C. Patents

(57) ABSTRACT

A buck-boost converter including an inductor, a first transistor, a second transistor, a third transistor, a fourth transistor, a voltage detection circuit, and a voltage control circuit is provided. The first transistor is coupled to a first terminal of the inductor and receives a first control signal. The second transistor is coupled to the first terminal of the inductor and receives a second control signal. The third transistor is coupled to a second terminal of the inductor and receives a third control signal. The fourth transistor is coupled to the second terminal of the inductor and receives a fourth control signal voltage. The detection circuit detects the third control signal to selectively provide a voltage drop indication signal. When a voltage conversion mode is a buck mode, the voltage control circuit switches a conduction state of the third control signal in response to the voltage drop indication signal.

8 Claims, 3 Drawing Sheets

… (1)

BUCK-BOOST CONVERTER

CROSS-REFERENCE TO RELATED APPLICATION

This application claims the priority benefit of Taiwanese application serial no. 109137676, filed on Oct. 29, 2020. The entirety of the above-mentioned patent application is hereby incorporated by reference herein and made a part of this specification.

BACKGROUND

Technical Field

The disclosure relates to a DC-to-DC converter, in particular to a buck-boost converter.

Description of Related Art

As portable electronic devices prevail, DC-to-DC converters are widely used in portable electronic devices that use batteries as the main power source because they do not require AC conversion and have high conversion efficiency. DC-to-DC converters can be broadly classified as buck converters, boost converters, and buck-boost converters. In a buck-boost converter, when operating in buck mode, the upper switch on the boost side should be fully on so that the upper and lower switches on the traditional boost side switch on and off by turns in a constant frequency. However, high switch frequency will cause too much energy consumption, resulting in poor efficiency, and low switch frequency may have the risk of switch shoot through, or even cause unstable output power.

SUMMARY

The disclosure provides a buck-boost converter capable of improving switch efficiency of transistors.

The buck-boost converter of the disclosure includes an inductor, a first transistor, a second transistor, a third transistor, a fourth transistor, a voltage detection circuit and a voltage control circuit. The inductor has a first terminal and a second terminal. The first transistor has a drain terminal receiving an input voltage, a source terminal coupled to the first terminal of the inductor, and a gate terminal receiving a first control signal. The second transistor has a drain terminal coupled to the first terminal of the inductor, a source terminal receiving a ground voltage, and a gate terminal receiving a second control signal. The third transistor has a drain terminal providing an output voltage, a source terminal coupled to the second terminal of the inductor, and a gate terminal receiving a third control signal. The fourth transistor has a drain terminal coupled to the second terminal of the inductor, a source terminal receiving the ground voltage, and a gate terminal receiving a fourth control signal. The voltage detection circuit is coupled to the gate terminal of the third transistor to receive the third control signal to detect a voltage level of the third control signal, and selectively provide a voltage drop indication signal based on a detection result of the third control signal. The voltage control circuit is coupled to the gate terminal of the first transistor, the gate terminal of the second transistor, the gate terminal of the third transistor, and the gate terminal of the fourth transistor. When the buck-boost converter operates in a buck mode, the voltage control circuit, in response to the voltage drop indication signal, switches the voltage level of the third control signal from a current level to a cut-off level.

Based on the above, the buck-boost converter according to the embodiment of the disclosure detects the voltage level and switches conduction of the third transistor and the fourth transistor in response to the voltage drop of the third control signal, thereby improving operating efficiency of the buck-boost converter.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION

Figure 1:
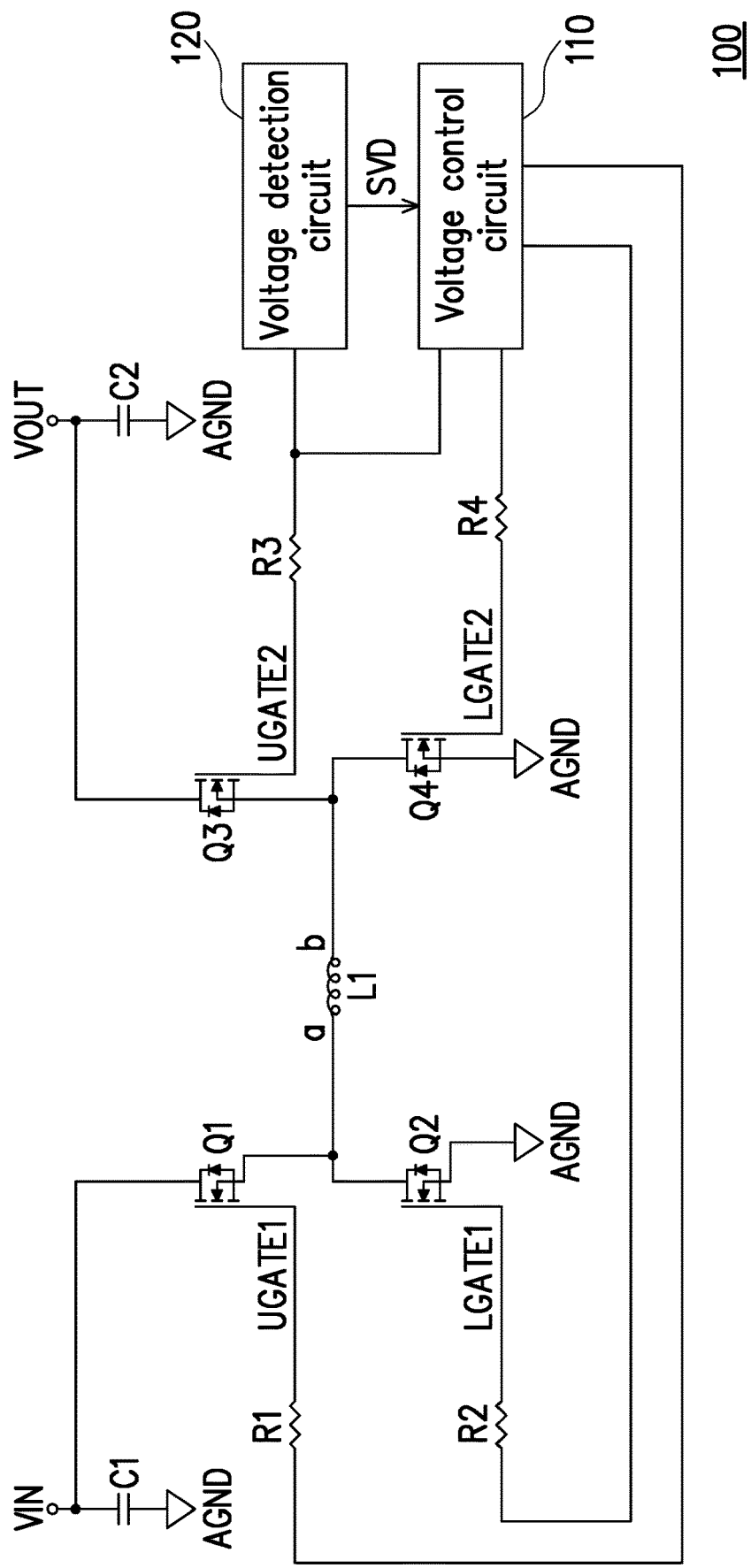
FIG. 1 is a schematic diagram of a buck-boost converter according to an embodiment of the disclosure.

FIG. 1 is a schematic diagram of a buck-boost converter according to an embodiment of the disclosure. Referring to FIG. 1, according to this embodiment, a buck-boost converter 100 includes an inductor L1, a first transistor Q1, a second transistor Q2, a third transistor Q3, a fourth transistor Q4, a voltage control circuit 110, a voltage detection circuit 120, a first capacitor C1, a second capacitor C2, and resistors R1 to R4.

The first transistor Q1 has a drain terminal receiving an input voltage VIN, a source terminal coupled to a first terminal of the inductor L1, and a gate terminal receiving a first control signal UGATE1. The second transistor Q2 has a drain terminal coupled to the first terminal of the inductor L1, a source terminal receiving a ground voltage AGND, and a gate terminal receiving a second control signal LGATE1.

The third transistor Q3 has a drain terminal providing an output voltage VOUT, a source terminal coupled to a second terminal b of the inductor L1, and a gate terminal receiving a third control signal UGATE2. The fourth transistor Q4 has a drain terminal coupled to the second terminal b of the inductor L1, a source terminal receiving the ground voltage AGND, and a gate terminal receiving a fourth control signal LGATE2. The first capacitor C1 is coupled between the input voltage VIN and the ground voltage AGND. The second capacitor C2 is coupled between the output voltage VOUT and the ground voltage AGND.

The voltage control circuit 110 is coupled to the gate terminals of the first transistor Q1, the second transistor Q2, the third transistor Q3, and the fourth transistor Q4 through resistors R1 to R4, respectively and provides the first control signal UGATE1, the second control signal LGATE1, the third control signal UGATE2 and the fourth control signal LGATE2 to the gate terminals of the first transistor Q1, the second transistor Q2, the third transistor Q3 and the fourth transistor Q4, respectively, based on voltage conversion modes of the buck-boost converter 100.

Furthermore, when a target voltage of the output voltage VOUT is greater than a current voltage of the output voltage VOUT, the buck-boost converter 100 may operate in a boost mode; when the target voltage of the output voltage VOUT is lower than the current voltage of the output voltage VOUT, the buck-boost converter 100 may operate in a buck mode.

The voltage detection circuit 120 receives the third control signal UGATE2 to detect a voltage level of the third control signal UGATE2, and selectively sends a voltage drop indication signal SVD based on a detection result of the third control signal UGATE2. When the voltage conversion mode of the buck-boost converter 100 is the buck mode, the voltage control circuit 110 determines, in response to the voltage drop indication signal SVD, a switching time point of the third control signal UGATE2 from a conduction level to a cut-off level, i.e., a time point at which the third transistor Q3 switches from conduction to cut-off.

Furthermore, when the buck-boost converter 100 operates in the buck mode and the voltage drop indication signal SVD is sent in response to the low voltage level (i.e., insufficient energy) of the third control signal UGATE2, the voltage control circuit 110 switches the third control signal UGATE2 from the conduction level to the cut-off level upon receipt of the voltage drop indication signal SVD, and the voltage control circuit 110 switches the fourth control signal LGATE2 from the cut-off level to the conduction level to reset a state of the gate terminal of the third transistor Q3. In this way, the voltage level of the control signal of the third transistor Q3 is detected, and the time point for switching the conduction of the third transistor Q3 and the fourth transistor Q4 is determined in response to voltage drop of the control signal of the third transistor Q3, thereby improving operation efficiency of the buck-boost converter.

Next, the voltage detection circuit 120 switches the third control signal UGATE2 from the cut-off level to the conduction level to conduct the third transistor Q3 after a preset time (e.g., a few microseconds) elapses after the third control signal UGATE2 is switched to the cut-off level. In addition, when the voltage conversion mode is the buck mode and the voltage control circuit 110 does not receive the voltage drop indication signal SVD, the third control signal UGATE2 would maintain at the conduction level to continuously conduct the third transistor Q3.

According to the embodiment of the disclosure, when the voltage conversion mode is the boost mode, the first control signal UGATE1 maintains at the conduction level, the second control signal LGATE1 maintains at the cut-off level, the third control signal UGATE2 maintains at the cut-off level, and the fourth control signal LGATE2 periodically switches between the cut-off level and the conduction level to control the voltage level of the output voltage VOUT. When the voltage conversion mode is the buck mode, the first control signal UGATE1 periodically switches between the cut-off level and the conduction level to control the voltage level of the output voltage VOUT, the second control signal LGATE1 maintains at the cut-off level, the third control signal UGATE2 maintains at the conduction level, and the fourth control signal LGATE2 maintains at the cut-off level.

According to this embodiment, single first capacitor C1 and single second capacitor C2 are shown for illustration, but according to the embodiment of the disclosure, the number of the first capacitor C1 and the number of the second capacitor C2 may depend on the requirements of the circuit, that is, the number of the first capacitor C1 and the number of the second capacitor C2 may be one or more respectively, and the embodiments of the disclosure are not limited thereto.

Figure 2:
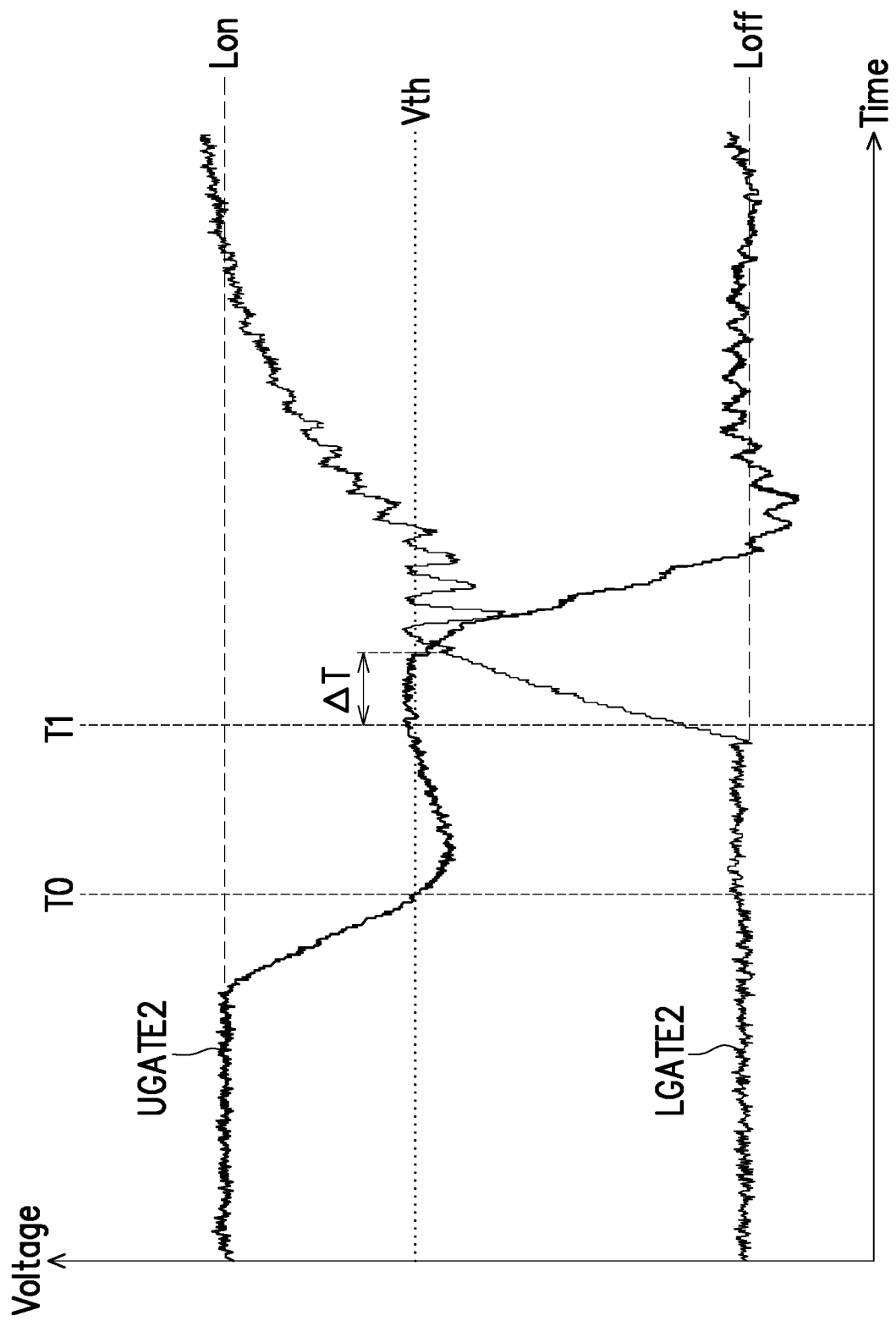
FIG. 2 is a schematic diagram illustrating waveforms of a third control signal and a fourth control signal of the buck-boost converter according to an embodiment of the disclosure.

FIG. 2 is a schematic diagram illustrating waveforms of a third control signal and a fourth control signal of the buck-boost converter according to an embodiment of the disclosure. Referring to FIG. 1 and FIG. 2, according to this embodiment, the voltage detection circuit 120 detects that the voltage level of the third control signal UGATE2 is lower than a preset voltage level Vth at a time T0, at this time, the voltage detection circuit 120 provides the voltage drop indication signal SVD to the voltage control circuit 110. When the voltage control circuit 110 receives the voltage drop indication signal SVD, the fourth control signal LGATE2 is switched from a cut-off level Loff to a conduction level Lon, starting at a switching time point T1 and the third control signal UGATE2 is switched from the current level (i.e., the preset voltage level Vth) to the cut-off level Loff after a delay time ΔT. The delay time ΔT is related to an equivalent resistance and an equivalent capacitance of the gate terminal coupled to the third transistor Q3, such as resistance of a resistor R3 and capacitance of a capacitor (not shown) coupled to the resistor R3.

According to the embodiment of the disclosure, the preset voltage level Vth may be an intermediate level (i.e., an average value) of the conduction level Lon and the cut-off level Loff or slightly higher than the intermediate level, depending on the circuit requirements.

Figure 3:
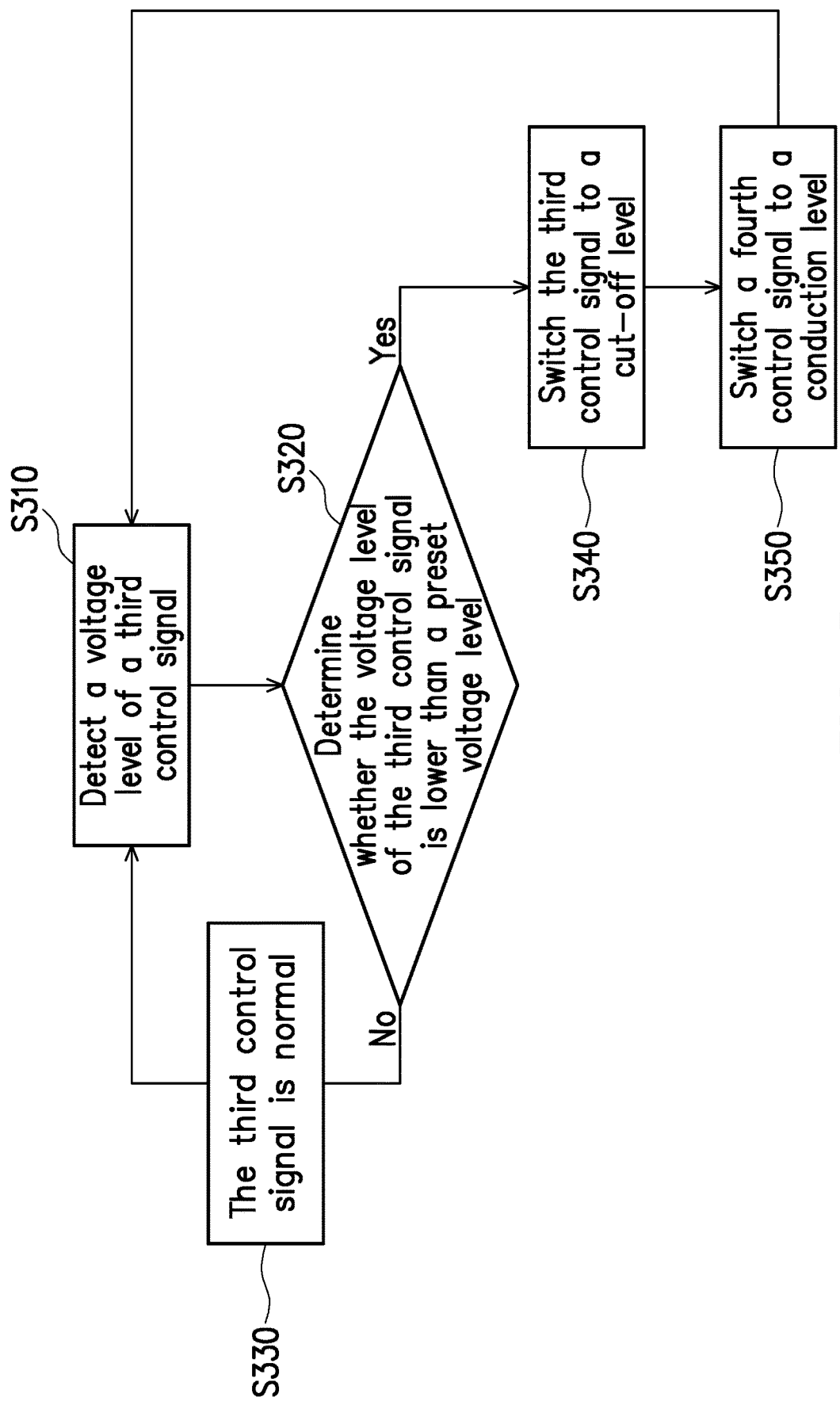
FIG. 3 is an operation flowchart of a third transistor and a fourth transistor of the buck-boost converter according to an embodiment of the disclosure in a buck mode.

FIG. 3 is an operation flowchart of a third transistor and a fourth transistor of the buck-boost converter according to an embodiment of the disclosure in a buck mode. Referring to FIG. 3, according to this embodiment, when the buck-boost converter operates in the buck mode, the voltage level of the third control signal of the third transistor is first detected (step S310), and the voltage level of the third control signal is determined whether it is lower than the preset voltage level (step S320). When the voltage level of the third control signal is not lower than the preset voltage level, that is, a determination result of step S320 is "No", the third control signal is normal (step S330), and then the flow goes back to step S310; when the voltage level of the third control signal is lower than the preset voltage level, that is, the determination result of step S320 is "Yes", the third control signal will be switched to the cut-off level (step S340) and the fourth control signal would be switched to the conduction level (step S350), and then the flow returns to step S310 after a preset time. Sequence of steps S310, S320, S330, S340, and S350 is for illustration, and the embodiments of the disclosure are not limited thereto. In addition, details of steps S310, S320, S330, S340, and S350 can be referred to the embodiments shown in FIG. 1 and FIG. 2 and therefore will not be repeated in the following.

In summary, the buck-boost converter according to the embodiments of the disclosure detects the voltage level of the third control signal and switches conduction of the third transistor and the fourth transistor in response to the voltage drop of the third control signal, thereby improving the operating efficiency of the buck-boost converter.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A buck-boost converter comprising:
an inductor having a first terminal and a second terminal;
a first transistor having a drain terminal receiving an input voltage, a source terminal coupled to the first terminal of the inductor, and a gate terminal receiving a first control signal;
a second transistor having a drain terminal coupled to the first terminal of the inductor, a source terminal receiving a ground voltage, and a gate terminal receiving a second control signal;
a third transistor having a drain terminal providing an output voltage, a source terminal coupled to the second terminal of the inductor, and a gate terminal receiving a third control signal;
a fourth transistor having a drain terminal coupled to the second terminal of the inductor, a source terminal receiving the ground voltage, and a gate terminal receiving a fourth control signal;
a voltage detection circuit coupled to the gate terminal of the third transistor, wherein the voltage detection circuit is configured to receive the third control signal to detect a voltage level of the third control signal, and selectively provide a voltage drop indication signal based on a detection result of the third control signal; and
a voltage control circuit coupled to the gate terminal of the first transistor, the gate terminal of the second transistor, the gate terminal of the third transistor, and the gate terminal of the fourth transistor, wherein when the buck-boost converter operates in a buck mode, the voltage control circuit, in response to the voltage drop indication signal, switches the voltage level of the third control signal from a current level to a cut-off level.

2. The buck-boost converter according to claim 1, wherein when the voltage level of the third control signal is lower than a preset voltage level, the voltage detection circuit provides the voltage drop indication signal to the voltage control circuit, and the voltage control circuit switches the voltage level of the third control signal from the current level to the cut-off level upon receipt of the voltage drop indication signal.

3. The buck-boost converter according to claim 2, wherein the preset voltage level is an intermediate level between a conduction level and the cut-off level.

4. The buck-boost converter according to claim 2, wherein the voltage control circuit waits a preset time after the voltage level of the third control signal switches to the cut-off level, and then switches the voltage level of the third control signal from the cut-off level to a conduction level.

5. The buck-boost converter according to claim 2, wherein when the buck-boost converter operates in the buck mode, a voltage level of the first control signal switches periodically between the cut-off level and a conduction level, a voltage level of the second control signal maintains at the cut-off level, the voltage level of the third control signal maintains at the conduction level, and a voltage level of the fourth control signal maintains at the cut-off level.

6. The buck-boost converter according to claim 5, wherein the voltage control circuit, in response to the voltage drop indication signal, switches the voltage level of the third control signal from the current level to the cut-off level after switching the fourth control signal from the cut-off level to the conduction level.

7. The buck-boost converter according to claim 2, wherein the voltage control circuit maintains the third control signal at a conduction level when the voltage drop indication signal is not received.

8. The buck-boost converter according to claim 1 further comprising:
at least one first capacitor coupled between the input voltage and the ground voltage; and
at least one second capacitor coupled between the output voltage and the ground voltage.

* * * * *